United States Patent
Pagot

(10) Patent No.: US 7,909,025 B2
(45) Date of Patent: Mar. 22, 2011

(54) METHOD OF CONTROLLING SCAVENGING OF THE BURNT GAS OF AN INDIRECT-INJECTION ENGINE, NOTABLY A SUPERCHARGED ENGINE, AND ENGINE USING SUCH A METHOD

(75) Inventor: Alexandre Pagot, Rueil Malmaison (FR)

(73) Assignee: Institut Francais du Petrole, Cedex (FR)

( * ) Notice: Subject to any disclaimer, the term of this patent is extended or adjusted under 35 U.S.C. 154(b) by 132 days.

(21) Appl. No.: 11/434,066

(22) Filed: May 16, 2006

(65) Prior Publication Data

US 2006/0272623 A1 Dec. 7, 2006

(30) Foreign Application Priority Data

May 24, 2005 (FR) .................................... 05 05237

(51) Int. Cl.
*F02B 33/00* (2006.01)
(52) U.S. Cl. ..................................... 123/559.1; 123/432
(58) Field of Classification Search ............... 123/559.1, 123/559.2, 432
See application file for complete search history.

(56) References Cited

U.S. PATENT DOCUMENTS

| | | | |
|---|---|---|---|
| 4,217,866 A * | 8/1980 | Nakajima ...................... 123/308 |
| 4,488,531 A | 12/1984 | Tadokoro et al. | |
| 4,548,175 A | 10/1985 | Kawai et al. | |
| 4,732,124 A * | 3/1988 | Nakamura et al. ............. 123/302 |
| 4,840,147 A * | 6/1989 | Tanahashi et al. ........ 123/65 VD |
| 4,905,646 A * | 3/1990 | Tanahashi ...................... 123/295 |
| 4,945,867 A * | 8/1990 | Tanahashi et al. ........ 123/65 VD |
| 5,125,380 A * | 6/1992 | Nakae et al. .................... 123/257 |
| 5,203,288 A * | 4/1993 | Melchior et al. ......... 123/65 VD |
| 5,230,320 A * | 7/1993 | Hitomi et al. .............. 123/559.1 |
| 5,239,960 A * | 8/1993 | Sasaki et al. ................... 123/308 |
| 5,343,839 A * | 9/1994 | Baika et al. .................... 123/257 |

(Continued)

FOREIGN PATENT DOCUMENTS

FR 2720113 11/1995

(Continued)

OTHER PUBLICATIONS

International Search Report.

*Primary Examiner* — Thomas Denion
*Assistant Examiner* — Douglas J. Duff
(74) *Attorney, Agent, or Firm* — Antonelli, Terry, Stout & Kraus, LLP.

(57) ABSTRACT

The present invention relates to a method of controlling an indirect-injection engine, notably a supercharged engine, in particular a spark-ignition engine, comprising at least one cylinder (10) including a combustion chamber (12), at least two air intake means (14, 16) comprising each a pipe (18, 20) controlled by an intake valve (22, 24), at least one fuel injection means (26, 28) associated with each intake means and at least one burnt gas exhaust means (30) with an exhaust valve (32), said engine running according to two intake modes, a mode with burnt gas scavenging and a mode without scavenging, characterized in that it consists in:
  supplying, in intake mode with scavenging, non-carbureted air through one (16) of the intake means then, in the vicinity of the scavenging end, in supplying carbureted air through the other (14) intake means,
  supplying, in intake mode without scavenging, carbureted air through the two intake means (14, 16).

11 Claims, 1 Drawing Sheet

U.S. PATENT DOCUMENTS

| | | | |
|---|---|---|---|
| 5,379,743 A * | 1/1995 | Stokes et al. | 123/308 |
| 5,553,580 A * | 9/1996 | Ganoung | 123/308 |
| 6,279,550 B1 * | 8/2001 | Bryant | 123/559.1 |
| 6,470,681 B1 | 10/2002 | Orton | |
| 6,612,285 B2 * | 9/2003 | Ganoung | 123/308 |
| 6,951,211 B2 * | 10/2005 | Bryant | 123/559.1 |
| 7,082,764 B2 * | 8/2006 | Lecointe et al. | 60/600 |
| 7,222,614 B2 * | 5/2007 | Bryant | 123/559.1 |
| 7,275,516 B1 * | 10/2007 | Cunningham et al. | 123/305 |
| 7,281,527 B1 * | 10/2007 | Bryant | 123/564 |

FOREIGN PATENT DOCUMENTS

| | | |
|---|---|---|
| FR | 2841294 | 12/2003 |
| JP | 2000-274252 | 10/2000 |

* cited by examiner

METHOD OF CONTROLLING SCAVENGING OF THE BURNT GAS OF AN INDIRECT-INJECTION ENGINE, NOTABLY A SUPERCHARGED ENGINE, AND ENGINE USING SUCH A METHOD

FIELD OF THE INVENTION

The present invention relates to a method of controlling scavenging of the burnt gas of an indirect-injection internal-combustion engine with at least two intake means, notably a supercharged engine, in particular a spark-ignition engine.

BACKGROUND OF THE INVENTION

As it is well known, the power delivered by an internal-combustion engine depends on the amount of air fed into the combustion chamber of this engine. This amount of air is itself proportional to the density of this air. Therefore, if high power is required, this amount of air is increased by compressing the air prior to feeding it into the combustion chamber. This operation is more commonly referred to as supercharging and it can be performed by a supercharging device such as a turbosupercharger or a driven compressor such as a screw type compressor.

In order to increase this amount of air supplied to the cylinder, an intake mode with a residual burnt gas scavenging stage is provided. This scavenging allows, before the end of the engine exhaust phase, to discharge the burnt gases present in the combustion chamber and to replace them by supercharged air.

As explained in patent U.S. Pat. No. 4,217,866, this scavenging stage consists in performing, at the end of the engine exhaust phase and at the beginning of the intake phase, overlapping of the exhaust and intake valves of a cylinder. This overlap is obtained by opening simultaneously these exhaust and intake valves for some degrees to some ten degrees of crankshaft rotation angle.

In the indirect-injection supercharged engine example described in this document, at least one burnt gas exhaust means with an exhaust valve controlling an exhaust pipe and at least two intake means are provided. One of the intake means is an intake means for non-carbureted supercharged air with a pipe and a valve, and the other intake means is an intake means for carbureted air, consisting of a pipe provided with a fuel injection nozzle and a valve.

Burnt gas scavenging is carried out, on the one hand, through overlap of the exhaust valve and of the non-carbureted supercharged air intake valve, the carbureted air intake valve remaining closed and, on the other hand, by the fact that the pressure of the air at the open intake valve is higher than the pressure of the exhaust gases still present in the combustion chamber. The non-carbureted supercharged air that is allowed into the combustion chamber scavenges these gases so as to discharge them through the exhaust valve. The non-carbureted supercharged air thus occupies the volume freed by these exhaust gases, which allows to quite significantly increase the amount of air supplied during the engine intake phase. Near the end of the scavenging stage, the exhaust valve closes, the carbureted supercharged air intake valve opens, the fuel injection nozzle is activated and carbureted supercharged air is fed into the combustion chamber through the other intake means as a complement to the non-carbureted supercharged air supplied.

Although this type of engine runs satisfactorily, it involves drawbacks that are by no means insignificant.

In fact, during conventional running of the engine following this scavenging stage and which requires no scavenging stage, the two intake valves remain simultaneously open during the engine intake phases. This has the effect of supplying carbureted air through one pipe and non-carbureted air through the other pipe. In the combustion chamber, mixing with these two types of air is difficult and occurs in such a way that the mixture is not homogeneous. This lack of homogeneity thus creates pollutants during combustion of this mixture. Furthermore, to obtain an average fuel/air ratio close to 1 for the fuel mixture in the combustion chamber, a large amount of fuel has to be injected into the carbureted air intake pipe with a fuel/air ratio close to 2. This large amount of fuel consequently generates, upon engine cold start-up, pollutants in form of unburned hydrocarbons (HC) during combustion of the mixture in the combustion chamber.

The present invention aims to overcome the aforementioned drawbacks by means of an engine air intake control method allowing better homogenization of the fuel mixture contained in the combustion chamber, as well as fuel consumption and emissions reduction.

SUMMARY OF THE INVENTION

The invention thus relates to a method of controlling an indirect-injection engine, notably a supercharged engine, in particular a spark-ignition engine, comprising at least one cylinder including a combustion chamber, at least two air intake means comprising each a pipe controlled by an intake valve, at least one fuel injection means associated with each intake means and at least one burnt gas exhaust means with an exhaust valve, said engine running according to two intake modes, a mode with burnt gas scavenging and a mode without scavenging, characterized in that it consists in:
  supplying, in intake mode with scavenging, non-carbureted air through one of the intake means then, in the vicinity of the scavenging end, in supplying carbureted air through the other intake means,
  supplying, in intake mode without scavenging, carbureted air through the two intake means.

Advantageously, scavenging of the burnt gases can consist in performing overlapping of the intake valve of one of the intake means with the exhaust valve in combination with an air pressure at the intake that is higher than the gas pressure at the exhaust.

The method can consist in supplying, in intake mode without scavenging, carbureted air with a fuel/air ratio close to 1 through each one of the two intake means.

The invention also relates to an indirect-injection internal-combustion engine, notably a supercharged engine, in particular a spark-ignition engine, comprising at least one cylinder including a combustion chamber, at least one intake means comprising a pipe controlled by an intake valve, at least one fuel injection means associated with the intake means for supplying carbureted air to the cylinder and at least one burnt gas exhaust means with an exhaust valve, characterized in that it also comprises another intake means with controlled fuel injection.

This engine can comprise control means allowing or preventing fuel injection into said other intake means.

BRIEF DESCRIPTION OF THE FIGURES

Other features and advantages of the invention will be clear from reading the description given hereafter by way of non limitative example, with reference to the accompanying drawings wherein.

DETAILED DESCRIPTION

Figure 1:
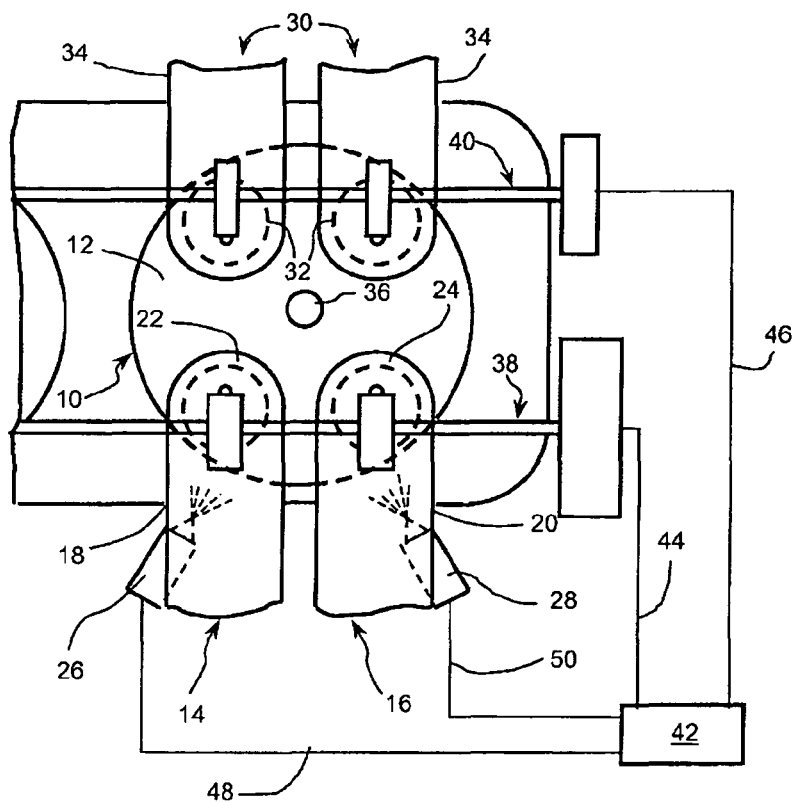
FIG. 1 diagrammatically shows an internal-combustion engine according to the invention.

FIG. 1 shows a supercharged internal-combustion engine, notably of indirect-injection type, in particular a spark-ignition engine. This engine comprises at least one cylinder 10 wherein a piston (not shown) slides and a combustion chamber 12 wherein combustion of a mixture of supercharged air and of fuel or of supercharged air with recirculated exhaust gas (EGR) and fuel takes place.

Cylinder 10 comprises at least two supercharged air intake means 14, 16, a conventional intake means 14 allowing intake of carbureted supercharged air (or carbureted air) and another intake means 16, referred to as controlled fuel injection intake means, allowing to supply supercharged air (or air) that can be either carbureted supercharged air (or carbureted air), or non-carbureted supercharged air. Conventionally, these intake means consist of an orifice provided in the cylinder head this engine is generally equipped with, a pipe 18, 20 communicating with this orifice and means 22, 24 for closing said orifice, such as an intake valve. A fuel injection means 26, 28 allows fuel to be supplied to pipe 18, 20 so that it mixes with the air circulating therein. Thus, conventional intake means 14 comprises pipe 18, valve 22 and injection nozzle 26, whereas controlled fuel injection intake means 16 comprises pipe 20, valve 24 and injection nozzle 28. This cylinder also comprises a burnt gas exhaust means, here two exhaust means 30, each one comprising closing means, for example exhaust valves 32, and exhaust pipes 34. In the example illustrated in FIG. 1, the cylinder also comprises an ignition means such as a spark plug 36 allowing to initiate combustion of the fuel mixture contained in combustion chamber 12.

Intake valves 22, 24 and exhaust valves 32 are controlled by means 38 and 40 respectively allowing to vary the lift laws of these valves, at the time of their opening/closing or when they lift, independently of one another or in association. These means are known as VVT (Variable Valve Timing), VVL (Variable Valve Lift) or VVA (Variable Valve Actuation). VVT type means are preferably used.

Control means 38 and 40 are driven by a control unit 42 such as the computer an engine is generally provided with. This computer comprises mappings or tables allowing to change, depending on the engine running conditions, the valve lift laws by means of control lines 44 and 46 respectively controlling means 38 and 40. This computer also controls activation or deactivation of injection nozzles 26, 28 by means of control lines 48, 50.

During operation and in case of power variation required by the engine or in the running configuration of this engine according to which it is at low or medium speed and at high load, the engine runs with supercharged air according to an intake mode with burnt gas scavenging. In this case, computer 42 initiates a valve overlap stage with burnt gas scavenging. Therefore, with reference to FIG. 2 also, the computer controls, in the vicinity of the exhaust top dead center PMH, the valve lift law variation means 38, 40 in such a way that exhaust valves 32 are open, intake valve 22 of conventional intake means 14 is closed and intake valve 24 of controlled intake means 16 opens, as shown by curve 24b in dotted line in FIG. 2. During this valve overlap, the computer also controls injection nozzles 26, 28 so that they are not active. Under the effect of the pressure difference between the pressure of the non-carbureted supercharged air fed into the combustion chamber through valve 24 and the pressure of the residual burnt gases present in this chamber, the latter are expelled from chamber 12 and discharged through valves 32. This allows the residual burnt gases present in combustion chamber 12 to be scavenged and replaced by fuel-free supercharged air.

As soon as the burnt gas scavenging stage is complete, exhaust valves 32 are closed under the effect of control means 40, intake valve 24 of controlled intake means 16 remains open (curve 24b) and intake valve 22 of conventional intake means 14 opens under the action of control means 38. Simultaneously, computer 42 controls activation of injection nozzle 26, fuel is thus injected into pipe 18 and a fuel mixture is supplied to combustion chamber 12. In order to improve the supply of carbureted air to this combustion chamber, fuel can be injected into pipe 18 in advance in relation to the cycle while intake valve 22 is still closed and before exhaust valves 32 close. Thus, the air contained in intake pipe 18 is carbureted air and, as these exhaust valves close and intake valve 22 opens, this previously carbureted air is fed into the combustion chamber.

In case of conventional engine running, i.e. in intake mode without burnt gas scavenging, notably during idle running, computer 42 controls control means 38 and 40 conventionally. More precisely, in the vicinity of the exhaust top dead center (PMH) of the piston, exhaust valves 32 close, intake valve 22 of conventional intake means 14 and intake valve 24 (curve 24a) of controlled fuel injection intake means 16 open as the exhaust valves close. Simultaneously, the computer controls activation of the two fuel injection nozzles 26 and 28 so as to inject fuel into pipes 18 and 20 and to obtain a fuel mixture in each pipe. Preferably, fuel injection is carried out in each pipe so as to obtain at intake valves 22, 24 a fuel mixture with a fuel/air ratio close to 1.

The mixture obtained in the combustion chamber is thus a homogeneous mixture even after carrying out a burnt gas scavenging stage.

The present invention is not limited to the example described and it encompasses any variant and equivalent.

Figure 2:
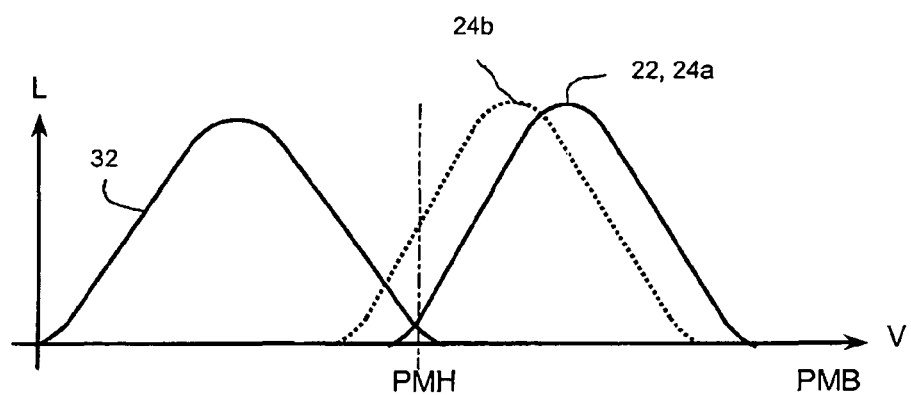
FIG. 2 is a graph showing the curves of the lift laws (L) of the valves of a cylinder as a function of the position (V) of the crankshaft of the engine according to the invention.

Notably, as illustrated by way of example in FIG. 2, the lift law of valve 24 can follow two curves under the action of control means 38, a curve 24b for the intake mode with scavenging and a curve 24a for the intake mode without scavenging, but an offset camshaft can also be used instead of control means 38. Such a camshaft thus allows to position, during the intake modes with and without scavenging, valve 24 only according to curve 24b, curve 22 remaining unchanged. This valve overlap will therefore allow burnt gas scavenging only when the pressure of the air at the intake valve is higher than the pressure of the exhaust gas at exhaust valve 36. This is generally the case at low and medium engine speed and at high loads.

The invention claimed is:

1. A method of controlling an indirect-injection engine comprising at least one cylinder, each cylinder including a combustion chamber, at least two air intake means comprising each a pipe controlled by an intake valve, at least one fuel injection means associated with each intake means and at least one burnt gas exhaust means with an exhaust valve, said engine designed to run according to two intake modes, a mode with burnt gas scavenging and a mode without scavenging, characterized in that it comprises:

supplying, in intake mode with scavenging during a portion of which only non-carbureted air is introduced into the at least one cylinder, non-carbureted air through one of the intake means then, in the vicinity of the scavenging end, in supplying carbureted air through the other intake means, supplying, in intake mode without scavenging, carbureted air through the two intake means.

2. An engine control method as claimed in claim 1, characterized in that burnt gas scavenging consists in performing overlap of the intake valve of one of the intake means with at least one exhaust valve in combination with an air pressure at the intake that is higher than the gas pressure at the exhaust.

3. An engine control method as claimed in claim 1, characterized in that it consists in supplying, in intake mode without scavenging, carbureted air with a fuel/air ratio close to 1 through each one of the two intake means.

4. An indirect-injection internal-combustion engine, comprising at least one cylinder, each cylinder including a combustion chamber, at least one intake means comprising a pipe controlled by an intake valve, at least one fuel injection means associated with the intake means for supplying carbureted air to the at least one cylinder, at least one burnt gas exhaust means with an exhaust valve, another intake means with controlled fuel injection, and a control unit for controlling the intake means and the another intake means to provide an intake mode with scavenging and an intake mode without scavenging, the control unit being configured to control the intake means and the another intake means to supply, in a first stage of the intake mode with scavenging, only non-carbureted air through one of the intake means then to supply, in a second stage of the intake mode with scavenging at the vicinity of the scavenging end, carbureted air through the other intake means, and to supply, in the intake mode without scavenging, carbureted air through the two intake means.

5. An internal-combustion engine as claimed in claim 4, characterized in that the control unit controls the another intake mean by allowing or preventing fuel injection into the another intake means.

6. An internal-combustion engine as claimed in claim 4, characterized in that it the control unit controls the intake means, the another intake means, the exhaust valve and the at least one fuel injection means during a portion of the intake mode with scavenging such that the exhaust valve is open, the intake valve is closed and the another intake valve is open, and the at least one fuel injection means is not active so that, under effect of pressure difference between a pressure of non-carbureted air fed into the combustion chamber through and a pressure of residual burnt gases present in the combustion chamber, the residual burnt gases are expelled from combustion chamber and discharged through the exhaust valves; the control unit controls the another intake means and the at least one fuel injection means in the vicinity of the scavenging end to supply carbureted air through the other intake means; and the control unit controls the intake means, the another intake means and the at least one fuel injection means during an intake mode without scavenging to supply carbureted air through the intake means and the another intake means.

7. An engine control method as claimed in claim 1, characterized in that a control unit controls the intake means, the other intake means, the exhaust valve and the at least one fuel injection means during the portion of the intake mode with scavenging such that the exhaust valve is open, the intake valve is closed and the other intake valve is open, and the at least one fuel injection means is not active so that, under effect of pressure difference between a pressure of non-carbureted air fed into the combustion chamber through and a pressure of residual burnt gases present in the combustion chamber, the residual burnt gases are expelled from combustion chamber and discharged through the exhaust valves;

the control unit controls the other intake means and the at least one fuel injection means in the vicinity of the scavenging end to supply carbureted air through the other intake means; and the control unit controls the intake means, the other intake means and the at least one fuel injection means during the intake mode without scavenging to supply carbureted air through the intake means and the other intake means.

8. An engine control method as claimed in claim 1, wherein the internal-combustion engine is a supercharged engine.

9. An engine control method as claimed in claim 8, wherein the internal-combustion engine is a spark-ignition engine.

10. An internal-combustion engine as claimed in claim 4, wherein the internal-combustion engine is a supercharged engine.

11. An internal-combustion engine as claimed in claim 10, wherein the internal-combustion engine is a spark-ignition engine.

* * * * *